(12) United States Patent
Nysen et al.

(10) Patent No.: US 7,394,878 B2
(45) Date of Patent: Jul. 1, 2008

(54) DIGITAL FREQUENCY DETERMINING APPARATUS AND METHODS USING MATCHED FILTERS

(75) Inventors: Peter J. Nysen, Palo Alto, CA (US); Paul A. Nysen, Sunnyvale, CA (US)

(73) Assignee: X-Cyte, Inc., San Jose, CA (US)

( * ) Notice: Subject to any disclaimer, the term of this patent is extended or adjusted under 35 U.S.C. 154(b) by 492 days.

(21) Appl. No.: 10/880,108

(22) Filed: Jun. 28, 2004

(65) Prior Publication Data

US 2005/0286660 A1 Dec. 29, 2005

(51) Int. Cl.
*H04L 27/06* (2006.01)
(52) U.S. Cl. ...................... 375/343; 375/152; 340/572.1
(58) Field of Classification Search ................ 375/343, 375/342, 340, 316, 152, 150; 340/572.1
See application file for complete search history.

(56) References Cited

U.S. PATENT DOCUMENTS

| | | | | |
|---|---|---|---|---|
| 5,638,454 A | * | 6/1997 | Jones et al. | 381/71.14 |
| 5,999,562 A | * | 12/1999 | Hennedy et al. | 375/152 |
| 6,060,815 A | * | 5/2000 | Nysen | 310/318 |
| 6,172,609 B1 | * | 1/2001 | Lu et al. | 340/572.4 |
| 6,466,634 B1 | * | 10/2002 | O'Toole et al. | 375/374 |
| 6,674,812 B1 | | 1/2004 | Stevenson | 375/302 |
| 6,707,844 B1 | * | 3/2004 | Imaizumi et al. | 375/148 |
| 6,710,813 B1 | * | 3/2004 | Grandchamp et al. | 348/487 |
| 2004/0171365 A1 | * | 9/2004 | Godambe et al. | 455/232.1 |
| 2006/0182197 A1 | * | 8/2006 | Godambe et al. | 375/297 |

* cited by examiner

*Primary Examiner*—Temesghen Ghebretinsae
(74) *Attorney, Agent, or Firm*—Patent Law Professionals; William E. Winters

(57) ABSTRACT

Methods and apparatus for determining a dominant frequency contained in a multi-frequency analog signal. An apparatus includes a first matched filter pair and a second a second matched filter pair. Both the first matched filter pair and the second matched filter pair are configured to receive in-phase (I-phase) and quadrature-phase (Q-phase) digital samples of a digitized multi-frequency analog signal. The summed magnitudes of outputs of the first and second matched filter pairs provide an indication of a dominant frequency represented in the digital samples. The first matched filter pair may include first and second matched filters, where the first matched filter includes a multiplier operable to multiply, on a sample-by-sample basis, a sample by a coefficient. A sample comprises an n-bit digital representation of either the I-phase amplitude or the Q-phase amplitude at a given instant. The coefficients are the terms required to complete the matching functions (e.g. 1-bit Walsh coefficients).

18 Claims, 7 Drawing Sheets

US 7,394,878 B2

DIGITAL FREQUENCY DETERMINING APPARATUS AND METHODS USING MATCHED FILTERS

FIELD OF THE INVENTION

The present invention relates to electronic systems and methods. More particularly, the present invention relates to systems and methods for determining a dominant frequency contained in analog signals having multiple frequencies.

BACKGROUND OF THE INVENTION

A transmitter in a radio frequency (RF) communications system modulates an electromagnetic wave carrier signal by impressing information (e.g. voice, image, data, etc.) on a carrier wave having a frequency that can be propagated over the airwaves. In the case of a digital communications system, the information is in the form of a stream of data bits, where each data bit has either a value of "0" or a value of "1". One commonly used modulation technique is frequency shift keying (FSK). The FSK technique operates by shifting a continuous carrier frequency in a binary manner to either one or the other of two discrete frequencies. One frequency is designated as the "mark" frequency and the other as the "space" frequency. The mark and space frequencies correspond to a binary "1" and a binary "0", respectively. This FSK modulation scheme (also known as "binary FSK") is shown in FIG. 1, where the space frequency is indicated by a first frequency shifted carrier of frequency $f_1$, and the mark frequency is indicated by a second frequency shifted carrier frequency of frequency $f_2$.

One particular and popular use of FSK is in radio frequency identification (RFID) systems. Among other applications, RFID systems are used for inventory control, supply chain management, and anti-theft of merchandise in stores. A typical RFID system 20 is shown in FIG. 2. RFID system 20 comprises a plurality of transponders (referred to in the art as "tags") 200 and one or more transceivers (referred to in the art as "interrogators" or "readers") 202. A reader 202 includes an antenna 204, which allows it to interrogate one or more of the tags 200 over a forward wireless link. The tags 200 also have their own respective antennas 208, which allow them to transmit tag information back to the reader 202 over reverse wireless link. The reader 202 and other readers (not shown in FIG. 2) communicate with a host computer 210. Data collected from the tags 200 can either be sent directly to the host computer 210 through standard interfaces, or it can be stored in the reader 202 and later uploaded to the host computer 210, either directly or by a wireless link, for data processing.

Tags are typically embodied as semiconductor microchips having small amounts of memory for storing the tag's ID number and, in some applications, information concerning the item to which the tag is associated. Further, tags are either "passive" or "active", depending on how they are powered. Active tags contain their own on-board power source, i.e. a battery, which the active tag uses to process received signals and to transmit tag information back to a reader. Passive tags do not have batteries. They derive their energy from RF signals broadcast by the reader and electromagnetically coupled to the tag antennae. Part of the coupled electromagnetic energy is rectified and stored in each tag. Passive tags use this stored energy as a power source to operate the logic and the RF modulator so as to send data back to the reader by a technique known as backscatter modulation.

In order for the reader 202 to address any particular tag (i.e. Tag A, B, C, D or E) from the population of tags, a process known as "singulation" is typically used. To singulate a tag from the population of tags, the reader 202 polls the tags 200 for their ID numbers (or derivative thereof), typically on a bit-by-bit basis. Because multiple tag responses may interfere with one another, anti-collision algorithms are typically employed in the singulation process. Anti-collision algorithms are either probabilistic or deterministic. One well-known probabilistic anti-collision algorithm is the Aloha technique, whereby tags respond to a polling signal from the reader 202 at random intervals. If a collision occurs, the tags responsible for the collision wait for another, usually longer, time interval before responding again. A known deterministic anti-collision algorithm is the so-called "binary tree-walking" algorithm. According to this approach, the reader 202 initially polls the tags 200 for the first bit of the tags' respective ID numbers. Based on the bit values received, the reader 202 then limits the number of tags which are to send subsequent bits of their ID numbers. This process is repeated until the ID of a single tag has been singulated.

In an FSK RFID system success of the anti-collision algorithm is conditioned upon the reader being capable of discriminating between the two FSK frequencies employed to represent binary "0's" and binary "1's, both of which may be received at the same time. It would be desirable, therefore, to have a frequency determining apparatus and method capable of determining a dominant frequency contained in simultaneously received signals having multiple frequencies.

SUMMARY OF THE INVENTION

Methods and apparatus for determining a dominant frequency contained in analog signals having multiple frequencies are disclosed. According to an exemplary aspect of the invention, an apparatus for determining a dominant frequency in digital samples of a multi-frequency analog signal includes a first matched filter pair and a second a second matched filter pair. Both the first matched filter pair and the second matched filter pair are configured to receive in-phase (I-phase) and quadrature-phase (Q-phase) digital samples of a digitized multi-frequency analog signal, where the I and Q are referred to as being in quadrature, or otherwise known as orthogonal or independent. The summed magnitudes of outputs of the first and second matched filter pairs provide an indication of a dominant frequency represented in the digital samples. The first matched filter pair may include first and second matched filters, where the first matched filter includes a multiplier operable to multiply, on a sample-by-sample basis, a sample by a coefficient. A sample comprises an n-bit digital representation of either the I-phase amplitude or the Q-phase amplitude at a given instant. The coefficients are the terms required to complete the matching functions (e.g. 1-bit Walsh coefficients).

According to another aspect of the invention, a method of determining an amplitude of a dominant frequency represented in digital samples of a multi-frequency analog signal includes sampling a multi-frequency analog signal at a sampling rate to generate digital samples; multiplying, on a sample-by-sample basis, samples by a first set of coefficients associated with a first frequency possibly corresponding to the dominant frequency; multiplying, on a sample-by-sample basis, samples by a second set of coefficients associated with a second frequency possibly corresponding to the dominant frequency; and using the results of multiplying to determine the dominant frequency represented in the digital samples.

According to another aspect of the invention, a digital frequency determining apparatus comprises a radio frequency (RF) receiver configured to receive a multi-frequency RF signal and convert it to a baseband signal having an in-phase (I-phase) component and a quadrature-phase (Q-phase) component; an analog-to-digital converter (ADC) operable to sample the I-phase and Q-phase baseband signal components to produce I-phase and Q-phase digital samples; a first matched filter pair configured to receive said I-phase and Q-phase digital samples; and a second matched filter pair configured to receive said I-phase and Q-phase digital samples. The summed magnitudes of outputs of said first and second matched filter pairs provide an indication of a dominant frequency present in the multi-frequency RF signal.

The summary of the aspects of the invention described above are meant only to provide a few aspects of the invention. Other aspects of the invention are described in the detailed description of the invention below and the claims set forth at the end of this disclosure. A further understanding of the scope, nature and advantages of the invention may be realized by reference to the remaining portions of the specification and the attached drawings.

DETAILED DESCRIPTION

Embodiments of the present invention include frequency determining apparatus and methods capable of determining a dominant frequency contained in simultaneously received signals having multiple frequencies. Those of ordinary skill in the art will realize that the following detailed description of the present invention is illustrative only and is not intended to be in any way limited to a particular exemplary embodiment. Other embodiments of the invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or similar parts.

Figure 1:
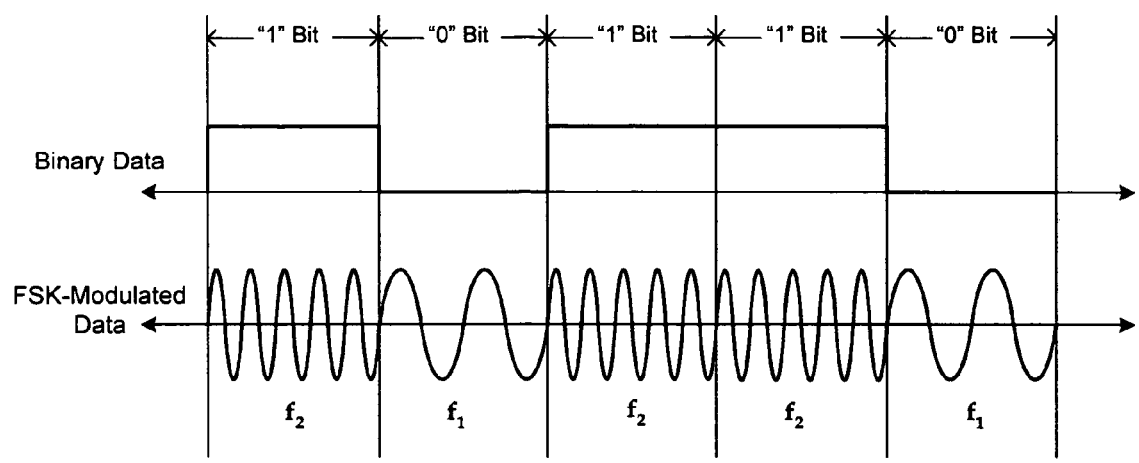
FIG. 1 illustrates the frequency shift keying (FSK) modulation scheme known in the prior art.
Figure 2:
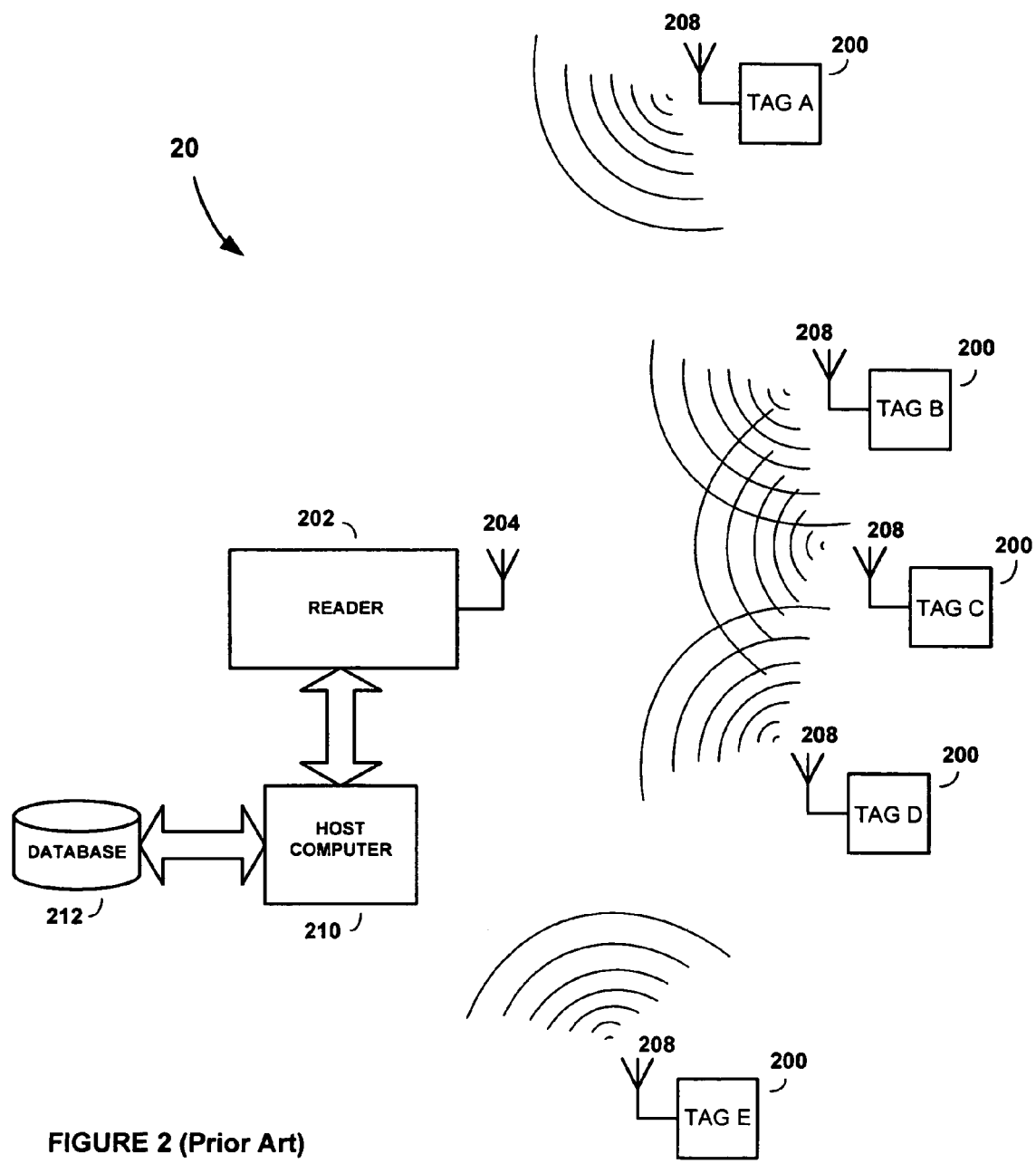
FIG. 2 shows a typical RFID system known in the prior art.
Figure 3:
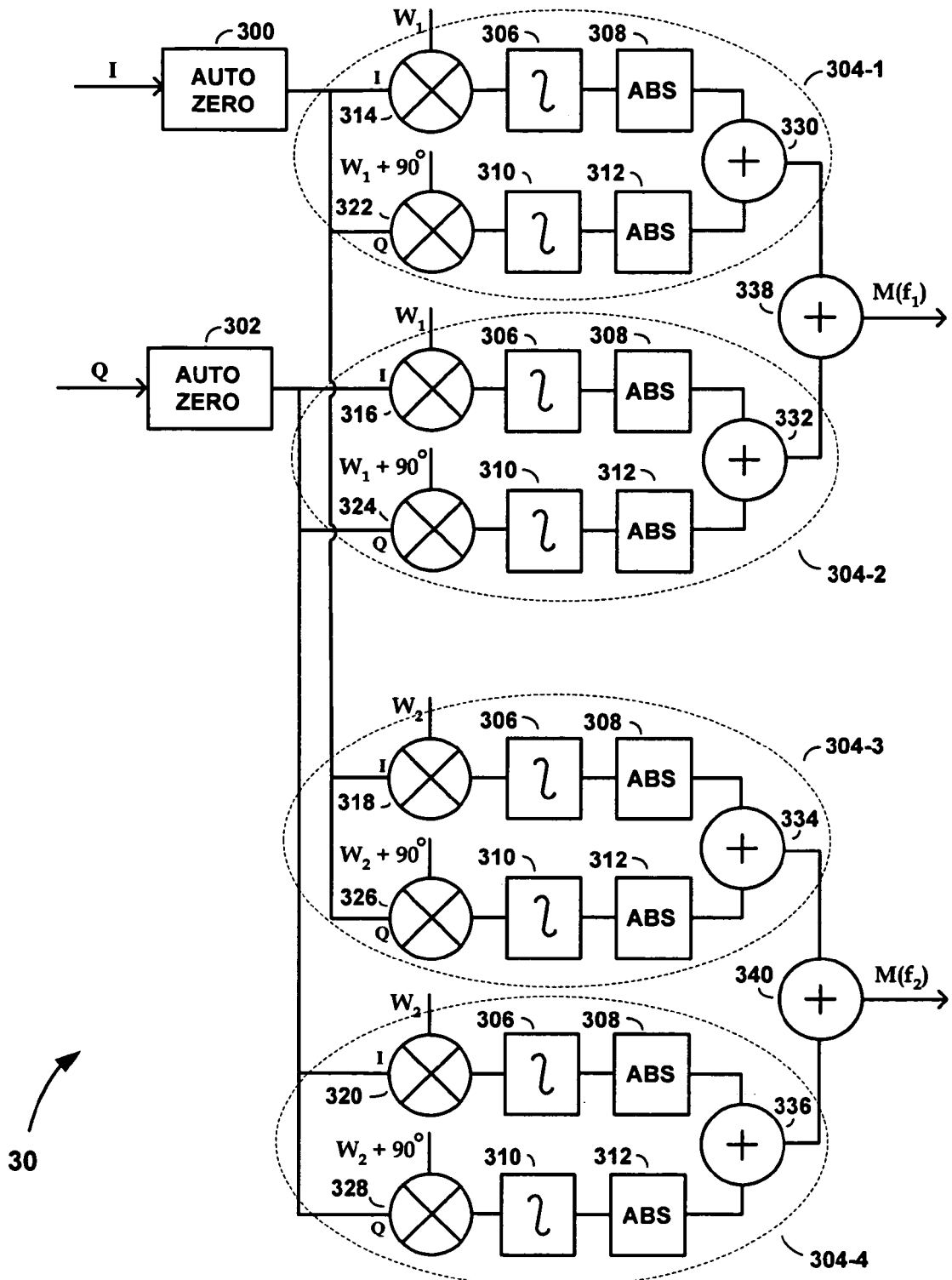
FIG. 3 shows a digital frequency determining apparatus, according to an embodiment of the present invention.

Referring to FIG. 3, there is shown a digital frequency determining apparatus 30, according to an embodiment of the present invention. As described in more detail below, the simplicity of the design and the type of components employed render the apparatus particularly suitable for implementation in a programmable device such as a field programmable gate array (FPGA). Apparatus 30 is coupled to a first digital auto-zero high-pass filter 300, which is configured to receive an in-phase (I-phase) digital data stream (i.e. sequence of samples) from an I-channel input, and to a second digital auto-zero high-pass filter 302, which is configured to receive a quadrature-phase (Q-phase) digital data stream from a Q-channel input. The digital auto-zero high-pass filters 300 and 302 operate to remove any DC offsets present in the I-phase and Q-phase digital data streams.

According to an aspect of the invention, the I and Q-phase digital data streams may be comprised of a predetermined number of digital data samples representing information received from multiple sources having multiple carrier frequencies (e.g. two subcarrier frequencies $f_1$ and $f_2$). The digitized data samples may represent, for example, data bits received from a plurality of tags of an FSK RFID system. Subcarrier frequencies $f_1$ and $f_2$ may be, for example, backscatter modulated subcarrier frequencies (e.g. mark and space frequencies) associated with an FSK RFID system.

The outputs of the digital auto-zero high-pass filters 300 and 302 are coupled to inputs of four matched filters 304-1, 304-2, 304-3 and 304-4. In particular, the output of digital auto-zero high-pass filter 300 is coupled to the inputs of matched filters 304-1 and 304-3, and the output of digital auto-zero high-pass filter 302 is coupled to the inputs of matched filters 304-2 and 304-4. Each of the matched filters 304-1, 304-2, 304-3 and 304-4 is comprised of an I-channel and Q-channel that operate on the subcarriers of an FSK RFID system, for example. Each of the I-channels of the matched filters 304-1, 304-2, 304-3 and 304-4 includes an integrator (i.e. an "accumulator") 306, and an absolute value operator 308. Similarly, each of the Q-channels of the matched filters 304-1, 304-2, 304-3 and 304-4 includes an integrator 310 and an absolute value operator 312 (or square law detector or equivalent). The I-channels of matched filters 304-1 and 304-2 also include 1-bit (e.g. 2's complement) multipliers 314 and 316, which have first inputs configured to receive the filtered I-phase and Q-phase digital data streams from auto-zero high-pass filters 300 and 302, respectively, and second inputs configured to receive a stream of 1-bit coefficients $W_1$. The term 1-bit multiplier refers to a multiplier that multiplies a 1-bit coefficient by an n-bit sample. The $W_1$ coefficients may be generated, for example, by sampling a periodic signal (e.g. a sine wave) of a first frequency (e.g. a first subcarrier frequency $f$, associated with an RFID system) at a rate substantially equal to a sampling rate of an analog-to-digital (ADC) converter used to digitize the digital data streams. Similarly, the I-channels of correlators 304-3 and 304-4 also include 1-bit multipliers 318 and 320, which have first inputs configured to receive the filtered in-phase and quadrature-phase digital data streams from auto-zero high-pass filters 300 and 302, respectively, and second inputs configured to receive a stream of 1-bit coefficients $W_2$. The $W_2$ coefficients may be generated, for example, by sampling a periodic signal (e.g. a sine wave) of a second frequency (e.g. a second subcarrier frequency $f_2$ associated with an RFID system) at a rate substantially equal to the sampling rate of an analog-to-digital (ADC) converter used to digitize the digital data streams. The 1-bit multipliers operate to multiply the value of each sample of the data streams by +1 or −1 depending on the condition of the particular coefficient (i.e. 1=+1 and 0=−1).

Similar to the I-channels described above, the Q-channels of matched filters 304-1 and 304-2 include 1-bit multipliers 322 and 324, which have first inputs configured to receive the filtered I-phase and Q-phase digital data streams from auto-zero high-pass filters 300 and 302, respectively, and second inputs configured to receive a stream of 1-bit coefficients $W_1$ but ninety-degrees out of phase to (i.e. in quadrature to) those received at the first inputs of multipliers 314 and 316 (indicated as $W_1+90°$ in FIG. 3). Similarly, the Q-channels of matched filters 304-3 and 304-4 include 1-bit multipliers 326 and 328, which have first inputs configured to receive the filtered in-phase and quadrature-phase digital data streams from auto-zero high-pass filters 300 and 302, respectively, and second inputs configured to receive a stream of 1-bit coefficients $W_2$ but ninety-degrees out of phase to those received at the first inputs of multipliers 318 and 320 (indicated as $W_2+90°$ in FIG. 3). The ninety-degree phase shift ensures that Wi and Wi+90° are orthogonal and therefore acquires all components of the incident signal for Wi.

As shown in FIG. 3, outputs of the absolute value operators 308 and 312 in each matched filter 304-1, 304-2, 304-3 and 304-4 are coupled to first and second inputs of intermediate summers 330, 332, 334 and 336. Outputs of intermediate summers 330 and 332 are in turn coupled to inputs of output summers 338 and 340, which provide output signals $M(f_1)$ and $M(f_2)$, respectively. Alternatively, the outputs of the absolute value operators 308 and 312 of matched filters 304-1 and 304-2 may be coupled to first and second multiple-input summers, to provide the output signals $M(f_1)$ and $M(f_2)$.

Figure 4:
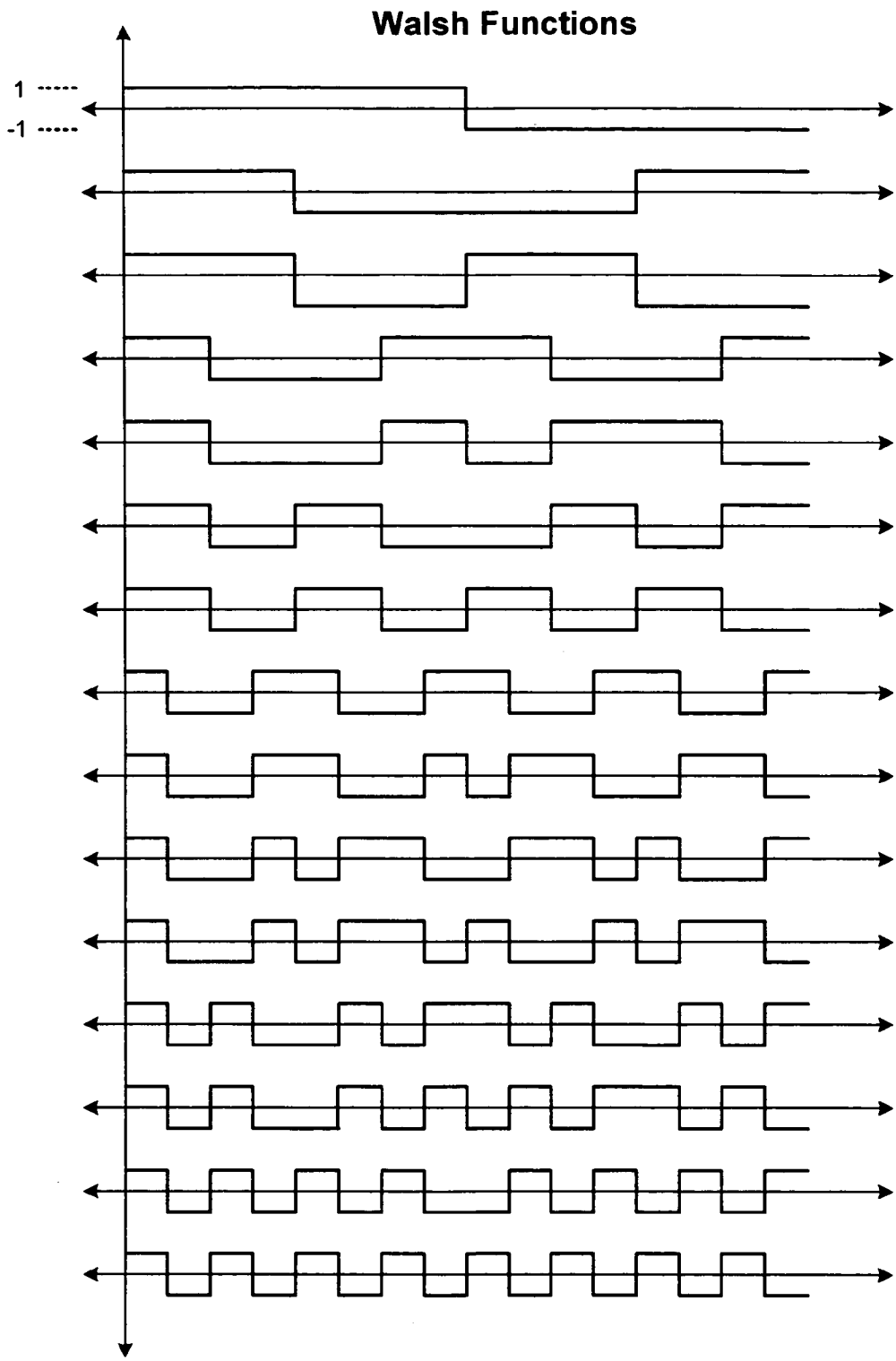
FIG. 4 shows an orthogonal set of Walsh functions having 1-bit coefficients sampled in time, which may be used in the various matched filters of the digital frequency determining apparatus in FIG. 3, according to an embodiment of the present invention.

Each of the streams of 1-bit coefficients $W_1$ and $W_2$ are comprised of coefficients of value −1 or +1 (or negative and positive values of some sort). Preferably, both $W_1$ and $W_2$ are zero-mean functions, meaning that each has an equal number of coefficients of values −1 and +1. An equal number of −1 and +1 coefficients ensures that DC biases are not introduced in the matched filter operations. $W_1$ and $W_2$ may comprise Walsh functions, such as shown in FIG. 4, or may comprise other orthogonal functions having similar characteristics.

During operation, the digital frequency determining apparatus 30 shown in FIG. 3 provides output signals $M(f_1)$ and $M(f_2)$. The larger of $M(f_1)$ and $M(f_2)$ over a given predetermined time period, signifies which of the carrier (e.g. subcarrier) frequencies $f_1$ and $f_2$ was most strongly represented in the stream of I-channel and Q-channel digital data streams during the given time period. In particular, each of the matched filters 304-1, 304-2, 304-3 and 304-4 receives the I-phase and Q-phase digital data streams. Then, for each bit received, the 1-bit multipliers 314-328 multiply, on a sample-by-sample basis, samples by 1-bit coefficients provided in functions $W_1$ and $W_2$. For each multiplication, each multiplier 314-328 provides an output state having an absolute value greater than zero if the input signal bit and 1-bit coefficient have the same value (i.e. if they "match" or, as some skilled in the art refer to as "correlate"), and provides an output state having a zero value if the bits do not match (a signal in quadrature will not match or correlate). The integrators 306 and 310 in each of the I and Q paths of the matched filters 304-1, 304-2, 304-3 and 304-4 accumulate the results of the n-bit sample by 1-bit coefficient multiplications in their respective paths over the predetermined time period and provide accumulated results to the absolute value operators 308 and 312, which convert any negative accumulated result to a positive value. The outputs of the absolute value operators 308 and 312 of matched filters 304-1 and 304-2 are summed by intermediate summers 330 and 332, the results of which are summed by the output summer 338. Similarly, the outputs of the absolute value operators 308 and 312 of correlators 304-3 and 304-4 are summed by intermediate summers 334 and 336, the results of which are summed by the output summer 340. The dominant frequency may then be determined by direct comparison of the magnitudes of output signals $M(f_1)$ and $M(f_2)$. The larger magnitude of $M(f_1)$ and $M(f_2)$ signifies the dominant frequency.

In addition to the foregoing, a minimum threshold can be set to ensure that the response of the digital frequency determining apparatus 30 is distinguishable from noise. Further, the magnitudes of $M(f_1)$ and $M(f_2)$, which provide an indication of signal strength, may be used to determine range or tag performance, for example, when the digital frequency determining apparatus 30 is used in an RFID application.

Those of ordinary skill in the art will readily understand and appreciate that the inventions described herein are not limited to using Walsh functions, and that other orthogonal functions may be used. Further, whereas the frequency determining apparatus 30 in FIG. 3 is shown as determining the dominant one of two frequencies $f_1$ and $f_2$ (e.g. FSK RFID subcarrier frequencies), those of ordinary skill in the art will readily appreciate and understand that the digital frequency determining apparatus 30 may be generalized (i.e. extended) so that it can determine from among n frequencies (i.e. $f_1$, $f_2$, ..., $f_n$), where n is an integer greater than or equal to two.

Figure 5:
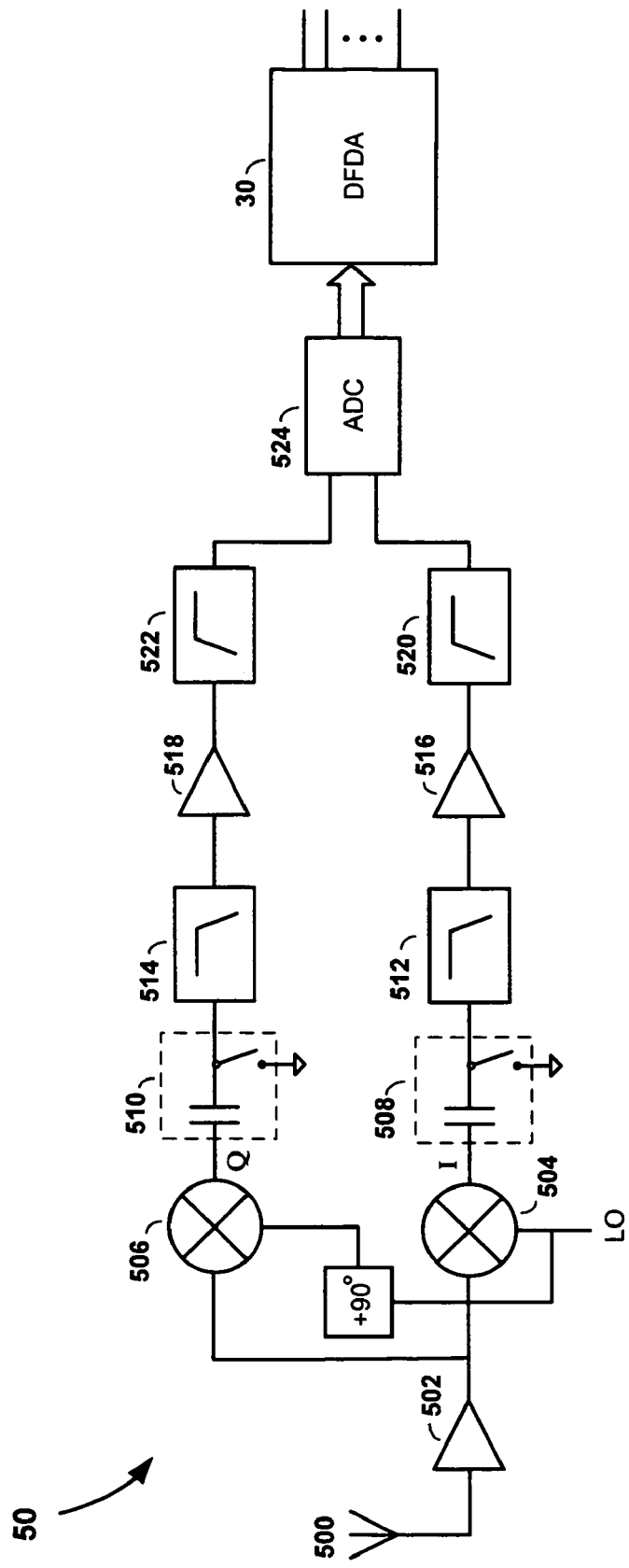
FIG. 5 shows an exemplary FSK receiver employing the digital frequency determining apparatus in FIG. 3, according to an embodiment of the present invention.

According to an embodiment of the present invention, the digital frequency determining apparatus 30 may comprise part of an FSK receiver 50, as shown in FIG. 5. An antenna 500 of FSK receiver 50 is configured to simultaneously receive a signal having two frequency shifted subcarrier frequencies (i.e. FSK mark and space frequencies), one having a first frequency shift of $f_1$ (e.g. 2.2 MHz) and the other having a second frequency shift of $f_2$ (e.g. 3.3 MHz). A low-noise amplifier 502 amplifies the received signal and directs it to both an I-phase mixer 504 and a Q-phase mixer 506. A local oscillator (LO) is coupled to an LO input of I-phase mixer 504, and a ninety-degree phase-shifted version of LO is coupled to an LO input of Q-phase mixer 506. The I-phase mixer 504 and Q-phase mixer 506 operate to down-convert the received signal to an intermediate frequency (IF). Outputs of the mixers 504 and 506 are coupled to inputs of switched capacitor auto-zeros 508 and 510, respectively. Until the receiver 50 is ready to receive data, the switches of the switched capacitor auto-zeros 508 and 510 remain closed. Accordingly, during this time, whatever the output voltage the mixers 504 and 506 have is stored on the respective capacitors of the switched capacitor auto-zeros 508 and 510. The switches of the switched capacitor auto-zeros 508 and 510 are maintained in their closed positions (i.e. remain shorted to ground) for a short time prior to edge transitions of the received signal, after which the switches are opened. In other words, the opening and closing of the switches of the switched capacitor auto-zeros 508 and 510 are timed so that they nearly follow the switching frequency of the transmitter, but are offset to a small degree so that any spikes can be effectively removed prior to edge transitions. This ensures that large voltage spikes on the received signal edges are not transmitted through the remainder of the receiver 50. Outputs of the switched-capacitor auto-zeros 508 and 510 are coupled to inputs of low-pass filters (LPFs) 512 and 514. The LPFs 512 and 514 have predetermined cutoff frequencies (e.g. 3.5 MHz), and are used to filter out noise and unwanted frequency byproducts generated by mixers 504 and 506. Outputs of LPFs 512 and 514 are coupled to inputs of amplifiers 516 and 518, respectively. The amplifiers 516 and 518 condition and amplify the filtered signals and couple them to high-pass filters (HPFs) 520 and 522. The HPFs 520 and 522 serve to remove any DC offsets present in the signals received from the amplifiers 516 and 518. Outputs of the HPFs 520 and 522 are coupled to a dual-channel analog-to-digital (ADC) converter 524, which operates to quantize the incoming signals at a sampling rate and provide digital data samples. The dual-channel digital data samples are coupled to the inputs of the digital frequency determining apparatus 30 (labeled "DFDA" in the drawing), and, optionally, first through digital auto-zero high-pass filters (e.g. digital auto-zero high-pass filters 300 and 302, as shown in FIG. 3).

Figure 6:
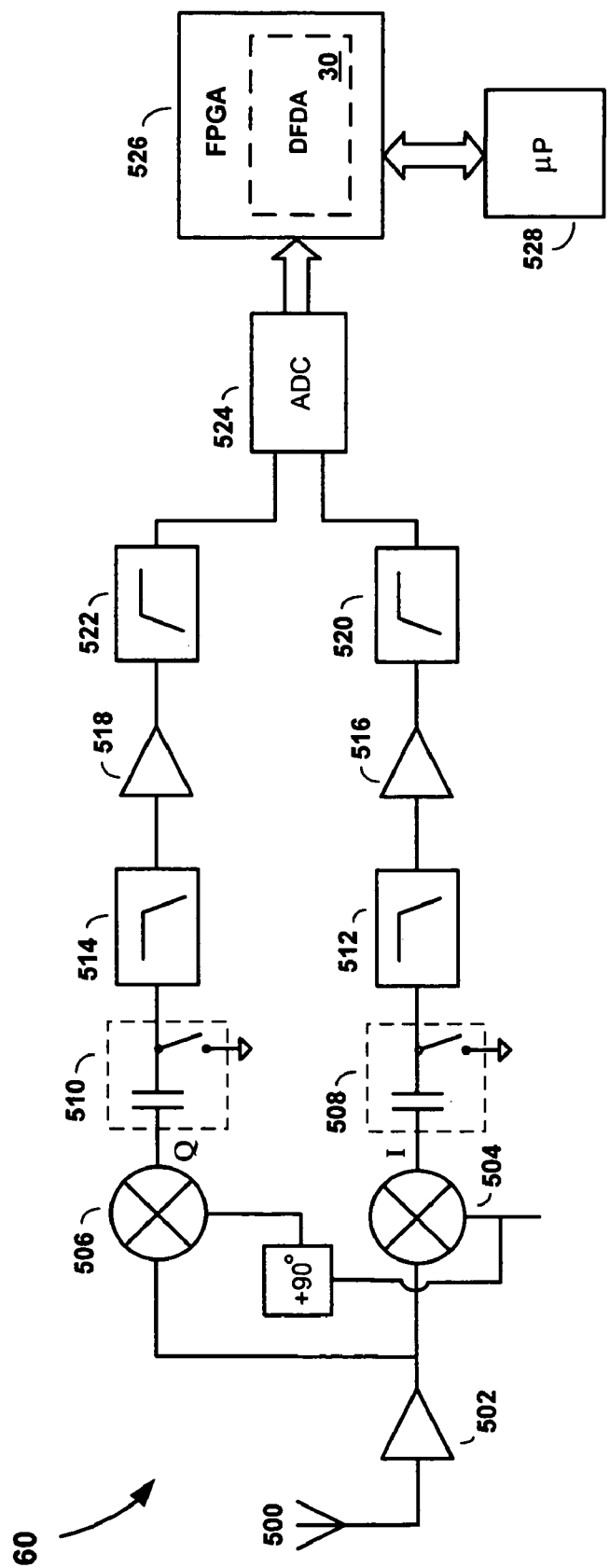
FIG. 6 shows an exemplary FSK receiver employing the digital frequency determining apparatus in FIG. 3, wherein the digital frequency determining apparatus is implemented in an FPGA, according to an embodiment of the present invention.

According to an embodiment of the present invention, the digital frequency determining apparatus 30 (with or without the auto-zero filters) may be implemented in a programmable device such as field-programmable gate array (FPGA). An FPGA implementation 60 is shown in FIG. 6. Although a microprocessor may be used to perform each of the various operations (e.g. multiply, integrate, absolute value, etc.) of the matched filters 304-1, 304-2, 304-3 and 304-4 sequentially, an FPGA can be advantageously configured so that it can perform many or all of the same operations (e.g. all of the multiplications, all of the integrations, etc.) simultaneously (i.e. in parallel).

The ability of the frequency determining apparatus 30 to determine the most dominant of two frequencies contained in multiple-frequency signals at the same time, makes it well suited for use in an FSK RFID system, where a plurality of tags may be transmitting "1's" represented by a first frequency shift $f_1$ and "0's" represented by a second frequency shift $f_2$ at the same time. For example, in an FSK RFID system, "0's" and "1's" are signaled by first and second tones (i.e. mark and space) for a plurality (e.g. 20) of system clock cycles. The frequency determining apparatus 30 can be employed to determine which of the tones has the largest magnitude, and, therefore, whether most of the tags transmitted a "0" or transmitted a "1". The RFID system can then use this magnitude information to instruct each of the plurality of tags to either enter a suspended state (i.e. a state in which they will not respond to a next command by the reader) or to remain in a ready state in which their next bit is transmitted in response to the next command of the reader. This process can be repeated until a single tag has been singulated from the plurality of tags.

Figure 7:
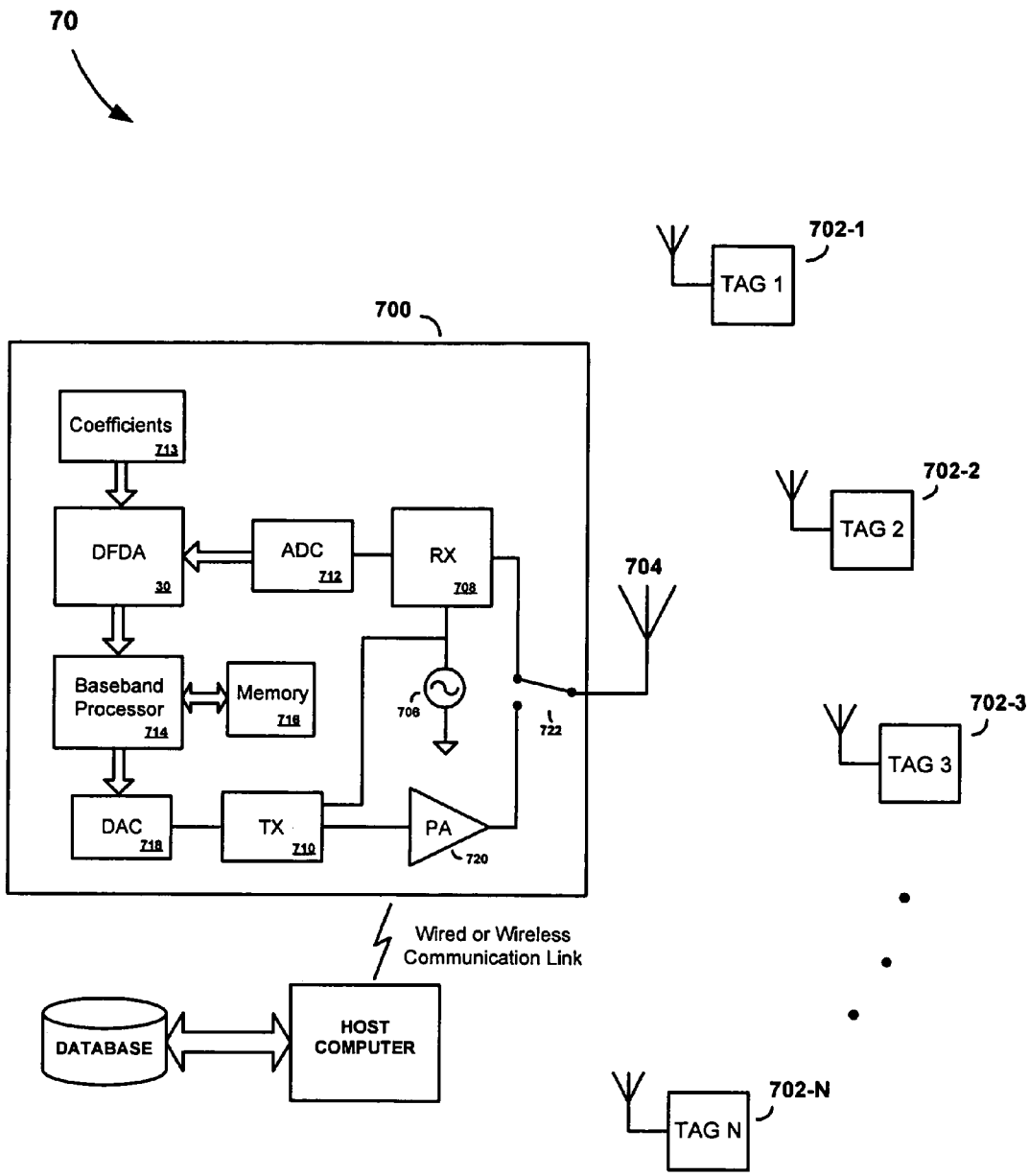
FIG. 7 shows an exemplary FSK RFID system having a reader employing the digital frequency determining apparatus in FIG. 3, according to an embodiment of the present invention.

FIG. 7 shows an exemplary embodiment of an FSK RFID system 70, which can perform the operations described above, and which utilizes the digital frequency determining apparatus 30, also described above. The FSK RFID system 70 includes a reader 700 and a plurality of tags 702-1, 702-2, ..., 702-N. The reader 700 includes an antenna 704; a system clock 706 for controlling a receiver (RX) 708 and a transmitter (TX) 710; an ADC 712; the digital frequency determining apparatus 30; a coefficient memory or generator 713; a baseband processor 714; a memory 716; a DAC 718; a power amplifier (PA) 720; and an TX/RX switch 722 for coupling the antenna 704 to either the front-end of the receiver 708, during times the reader 700 is receiving data, or, alternatively, to the output of the PA 720, during times when the reader 700 is transmitting data. The Walsh function (or other zero-mean function) coefficients can be generated, for example, by sampling one or more sinusoidal waves at the desired coefficient stream frequencies; by utilizing one or more frequency synthesizers; by employing a rate generator, by deriving the coefficients from one or more state machines; by retrieving the coefficients from a look up table (LUT), etc. Using one or more state machines is beneficial since the state machines and some, or the remainder of, the digital frequency determining apparatus 30 elements can be implemented in an FPGA or other programmable device, as described above.

While particular embodiments of the present invention have been shown and described, it will be obvious to those skilled in the art that, based upon the teachings herein, changes and modifications may be made without departing from this invention and its broader aspects. For example, whereas the digital frequency determining apparatus 30 is shown and described in the context of binary FSK, those of ordinary skill in the art will readily understand and appreciate that the principles of the present invention may be extended to M-ary FSK implementations by simply adding additional matched filters and providing additional coefficient generators. Further, those of ordinary skill in the art can readily appreciate and understand that the digital frequency determining apparatus 30 may be modified so that it can operate using QAM (quadrature amplitude modulation), by replacing the 1-bit multipliers with appropriate higher order multipliers. Still further, whereas a specific exemplary embodiment of the invention is described in the context of an exemplary RFID system 70, those of ordinary skill in the art will readily appreciate and understand that the concepts underlying the present invention may be applied to other frequency determining contexts requiring the determination of a frequency contained in simultaneously received signals having multiple frequencies. Finally, whereas the exemplary embodiments have been described as using traditional tonal components, quadrature non-tonal signals can also be used. Therefore, the appended claims are intended to encompass within their scope all such changes and modifications as are within the true spirit and scope of this invention.

We claim:

1. An apparatus for determining a dominant frequency represented in digital samples of a multi-frequency analog signal, said apparatus comprising:
   a first matched filter pair configured to receive in-phase (I-phase) and quadrature-phase (Q-phase) digital samples of a multi-frequency analog signal, said first matched filter pair including:
      a first matched filter having an I-channel and a Q-channel, the I-channel including a multiplier operable to multiply the I-phase digital samples by a first set of coefficients, and the Q-channel including a multiplier operable to multiply the I-phase digital samples by a second set of coefficients that are in quadrature to the first set of coefficients, and
      a second matched filter having an I-channel and a Q-channel, the I-channel including a multiplier operable to multiply the Q-phase digital samples by said first set of coefficients, and the Q-channel including a multiplier operable to multiply the Q-phase digital samples by said second set of coefficients; and
   a second matched filter pair configured to receive said I-phase and Q-phase digital samples,
   wherein summed magnitudes of outputs of said first and second matched filter pairs provide an indication of a dominant frequency represented in the digital samples.

2. The apparatus of claim 1 said second matched filter pair comprises:
   a third matched filter having an I-channel and a Q-channel, the I-channel including a multiplier operable to multiply the I-phase digital samples by a third set of coefficients, and the Q-channel including a multiplier operable to multiply the I-phase digital samples by a fourth set of coefficients that are in quadrature to the third set of coefficients; and
   a fourth matched filter having an I-channel and a Q-channel, the I-channel including a multiplier operable to multiply the Q-phase digital samples by said third set of coefficients, and the Q-channel including a multiplier operable to multiply the Q-phase digital samples by said fourth set of coefficients.

3. The apparatus of claim 1 wherein the first and second sets of coefficients comprise Walsh functions.

4. The apparatus of claim 1 wherein said first set of coefficients comprises a first set of 1-bit coefficients and the multiplier of said first matched filter is operable to multiply, on a sample-by-sample basis, samples of the I-phase digital samples by coefficients of said first set of 1-bit coefficients.

5. The apparatus of claim 4 wherein said first set of coefficients comprises a second set of 1-bit coefficients and the multiplier of said second matched filter is operable to multiply, on a sample-by-sample basis, samples of the Q-phase digital samples by coefficients of said second set of 1-bit coefficients.

6. A method of determining a dominant frequency represented in digital samples of a multi-frequency analog signal, said method comprising:

sampling a multi-frequency analog signal at a sampling rate to generate digital samples;

multiplying, on a sample-by-sample basis, said samples by a first set of coefficients associated with a first frequency possibly corresponding to the dominant frequency;

multiplying, on a sample-by-sample basis, said samples by a second set of coefficients associated with a second frequency possibly corresponding to the dominant frequency; and using the results of both multiplying operations to determine the dominant frequency represented in the digital samples, wherein using the results of both multiplying operations to determine the dominant frequency represented in the digital samples comprises separately accumulating results of the multiplying steps, and using the magnitudes of the separately accumulated results to determine the dominant frequency.

7. The method of claim 6 wherein the first and second frequencies correspond to first and second subcarrier frequencies of an RFID system.

8. A digital frequency determining apparatus, comprising:

a radio frequency (RF) receiver configured to receive a multi-frequency RF signal and convert it to a baseband signal having an in-phase (I-phase) component and a quadrature phase (Q-phase) component;

an analog-to-digital converter (ADC) operable to sample the I-phase and Q-phase baseband signal components to produce I-phase and Q-phase digital samples;

a first matched filter pair configured to receive said I-phase and Q-phase digital samples, said first matched filter pair including:

a first matched filter having an I-channel and a Q-channel, the I-channel including a multiplier operable to multiply the I-phase digital samples by a first set of coefficients, and the Q-channel including a multiplier operable to multiply the I-phase digital samples by a second set of coefficients that are in quadrature to the first set of coefficients, and a second matched filter having an I-channel and a Q-channel, the I-channel including a multiplier operable to multiply the Q-phase digital samples by said first set of coefficients, and the Q-channel including a multiplier operable to multiply the Q-phase digital samples by said second set of coefficients; and a second matched filter pair configured to receive said I-phase and Q-phase digital samples, wherein summed magnitudes of outputs of said first and second matched filter pairs provide an indication of a dominant frequency present in the multi-frequency RF signal.

9. The apparatus of claim 8 wherein the multi-frequency signal is a frequency shift keying (FSK) modulated signal.

10. The apparatus of claim 9 wherein the multi-frequency signal is comprised of first and second subcarriers in an RFID system.

11. The apparatus of claim 8 wherein the first and second sets of coefficients comprise Walsh functions.

12. A tag reader for a radio frequency identification (RFID) system, comprising:

a transceiver having a transmit path and a receive path selectively coupled to an antenna; and a plurality of matched filters configured within the receive path of the transceiver operable to receive digital samples of a plurality of multi-frequency radio frequency (RF) signals received from a plurality of RFID tags, said plurality of multi-frequency RF signals having frequency changing characteristics representing a plurality of digital bits associated with said plurality of RFID tags, wherein said plurality of matched filters comprises a first matched filter pair configured to operate on said digital samples according to a first set of coefficient, a second matched filter pair configured to operate on said digital samples according to a second set of coefficients, and wherein resulting summed magnitudes of outputs of the first and second matched filter pairs provide an indication of a dominant frequency represented in the digital samples.

13. The tag reader of claim 12 wherein the plurality of matched filters is configured to use said frequency changing characteristics of said plurality of multi-frequency RF signals to determine a binary number associated with one of said RFID tags of said plurality of RFID tags.

14. The tag reader of claim 12 wherein the plurality of matched filters is configured to use said frequency changing characteristics of said plurality of multi-frequency RF signals to singulate an RFID tag from said plurality of RFID tags.

15. A method of identifying a tag from among a plurality of tags in a radio frequency identification (RFID) system, comprising:

receiving a plurality of radio frequency (RF) signals from a plurality of RFID tags, each RF signal having time changing characteristics representing an identity of an associated tag; and filtering said plurality of RF signals to determine the identity of at least one of said plurality of RFID tags, wherein filtering said plurality of RF signals includes filtering digital samples of said plurality of RF signals according to a first set of coefficients, separately filtering said digital samples according to a second set of coefficients.

16. The method of claim 15, further comprising singulating a tag from said plurality of RFID tags based on said filtering.

17. The method of claim 15 wherein the time changing characteristics of the plurality of RF signals comprise frequency shifts between first and second frequencies.

18. The method of claim 15 wherein filtering digital samples of said plurality of RF signals according to the first set of coefficients is performed by a first pair of matched filters and filtering said digital samples according to the second set of coefficients is performed by a second pair of matched filters.

* * * * *